United States Patent
Iyer et al.

(10) Patent No.: US 7,277,631 B1
(45) Date of Patent: Oct. 2, 2007

(54) METHOD AND APPARATUS FOR PROCESSING PROTECTION SWITCHING MECHANISM IN OPTICAL CHANNEL SHARED PROTECTION RINGS

(75) Inventors: Ravichandran Iyer, Freehold, NJ (US); Manjunath Sampangi, San Jose, CA (US); Antonio Rodriguez-Moral, Madrid (ES); Paul Bonenfant, Ocean, NJ (US); Xiaowen Mang, Manalapan, NJ (US); Leah Zhang, Holmdel, NJ (US)

(73) Assignee: Meriton Networks US Inc., Wilmington, DE (US)

( * ) Notice: Subject to any disclaimer, the term of this patent is extended or adjusted under 35 U.S.C. 154(b) by 692 days.

(21) Appl. No.: 10/200,066

(22) Filed: Jul. 19, 2002

Related U.S. Application Data

(60) Provisional application No. 60/306,710, filed on Jul. 20, 2001.

(51) Int. Cl.
*H04B 10/00* (2006.01)
(52) U.S. Cl. ......................................................... 398/1
(58) Field of Classification Search ................... 398/3, 398/5
See application file for complete search history.

(56) References Cited

U.S. PATENT DOCUMENTS

| | | | | |
|---|---|---|---|---|
| 5,412,651 | A * | 5/1995 | Gorshe | 370/412 |
| 6,272,107 | B1 * | 8/2001 | Rochberger et al. | 370/216 |
| 6,721,502 | B1 | 4/2004 | Al-Salameh et al. | 398/3 |
| 6,724,781 | B1 * | 4/2004 | Dupont | 370/535 |
| 6,763,190 | B2 | 7/2004 | Agrawal et al. | 398/5 |
| 6,795,394 | B1 * | 9/2004 | Swinkels et al. | 370/222 |
| 6,970,417 | B1 | 11/2005 | Doverspike et al. | 370/216 |
| 7,031,299 | B2 | 4/2006 | Chaudhuri et al. | 370/352 |

(Continued)

OTHER PUBLICATIONS

Y. Park, "Architecture of a Bidirectional Wavelength Path Switched Ring and Its Implementation Schemes", IEEE Photonics Technology Letters, vol. 12, No. 9, Sep. 2000.*

(Continued)

*Primary Examiner*—Shi K Li
(74) *Attorney, Agent, or Firm*—Mayer & Williams PC; Stuart H. Mayer, Esq.; Karin L. Williams, Esq.

(57) ABSTRACT

A method for merging protection switching messages in an optical network enables a control of the amount of message bandwidth used for sending protection switching messages. A method for performing protection switching in an optical network does so in an optimal manner by performing the protection switching actions in the various nodes of a protection path in parallel rather than in sequence. To do so, a channel failure message is transmitted from an end node A in the optical network upon detecting a failure in a link in the optical network that includes the end node A. If a failure can be detected at both end nodes, the channel failure messages are transmitted from both end nodes the moment they detect failure without any further waiting. Upon receiving the first channel failure message regardless its originating end node, switching actions in intermediate nodes are initiated. The channel failure messages are forwarded from the intermediate nodes to their corresponding next nodes before completing switching actions in the intermediate nodes. When receiving channel failure response messages, these messages are forwarded to a next node from the intermediate node only after switching actions are complete in the intermediate node.

8 Claims, 16 Drawing Sheets

U.S. PATENT DOCUMENTS

2002/0138614 A1    9/2002   Hall ........................... 709/225

OTHER PUBLICATIONS

"Computer Networks" by A. Tanenbaum, Prentice-Hall, 1981, p. 141.*

GR-1230-Core, "Sonet BLSR Equipment Generic Criteria", Issue 4, Dec. 1998, Section 6.

S. Ramamurthy et al., "Survivable WDM Mesh Networks, Part II - Restoration", IEEE, 1999.

* cited by examiner

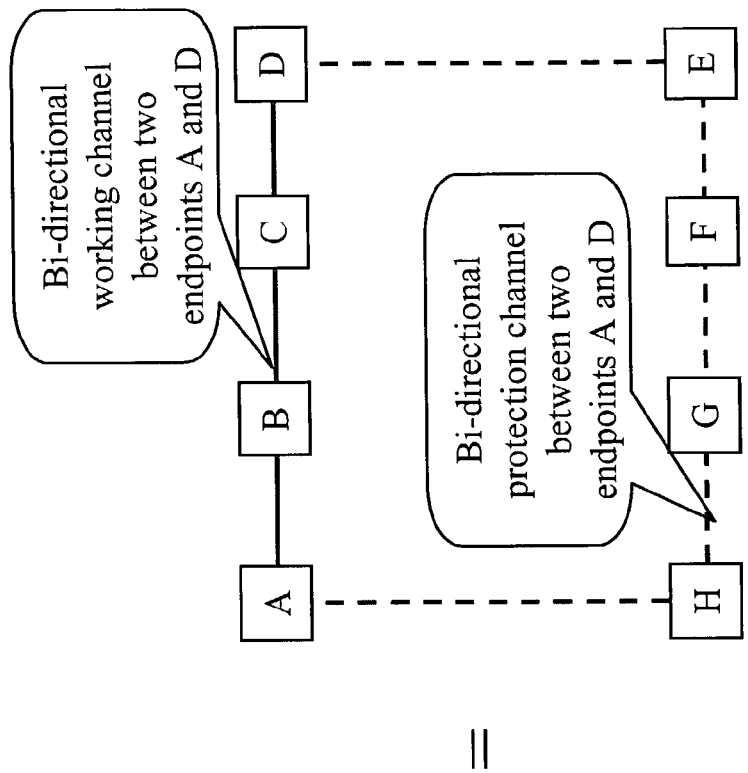
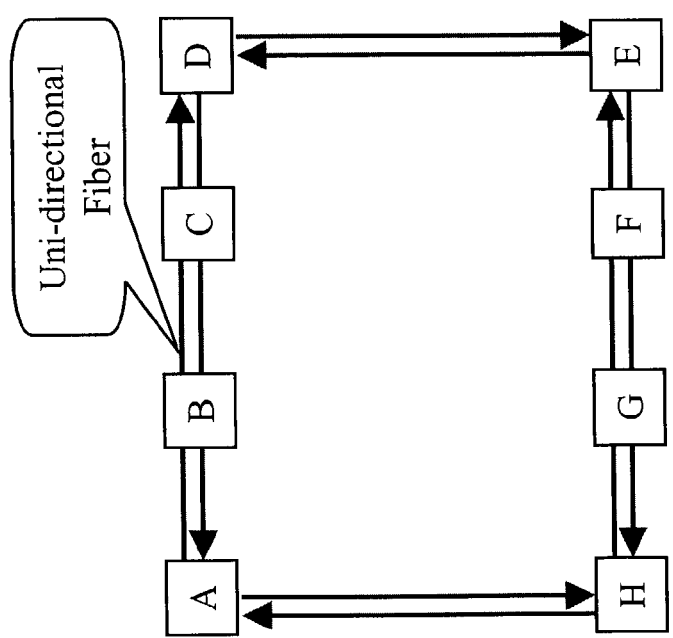
Figures 1A-B - An Example of Optical Ring

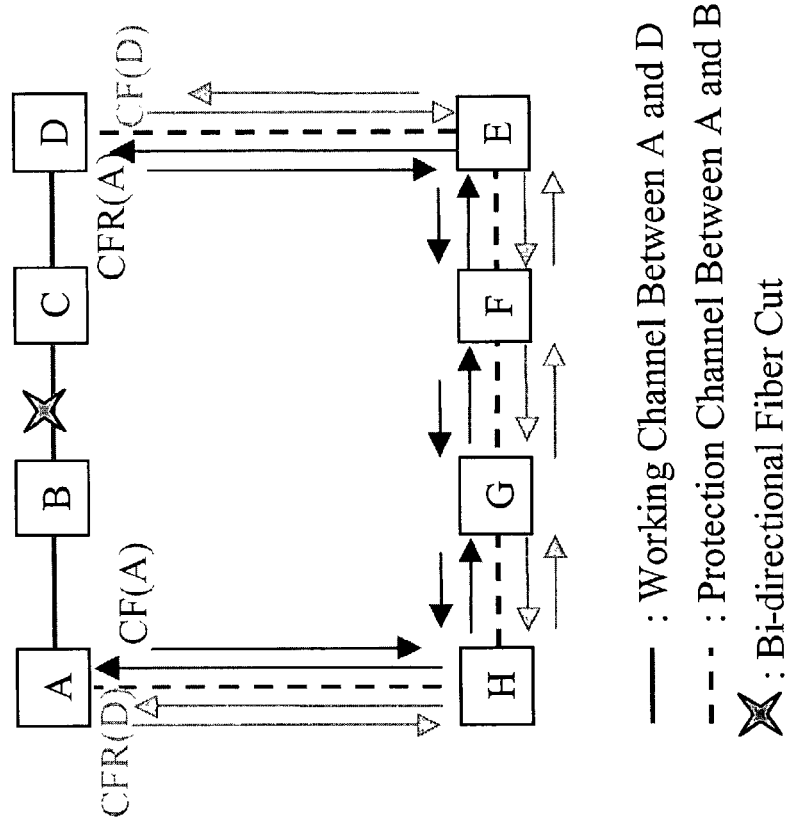
Figure 2 - Signaling Message Flows in response to a Bi-directional Fiber Cut

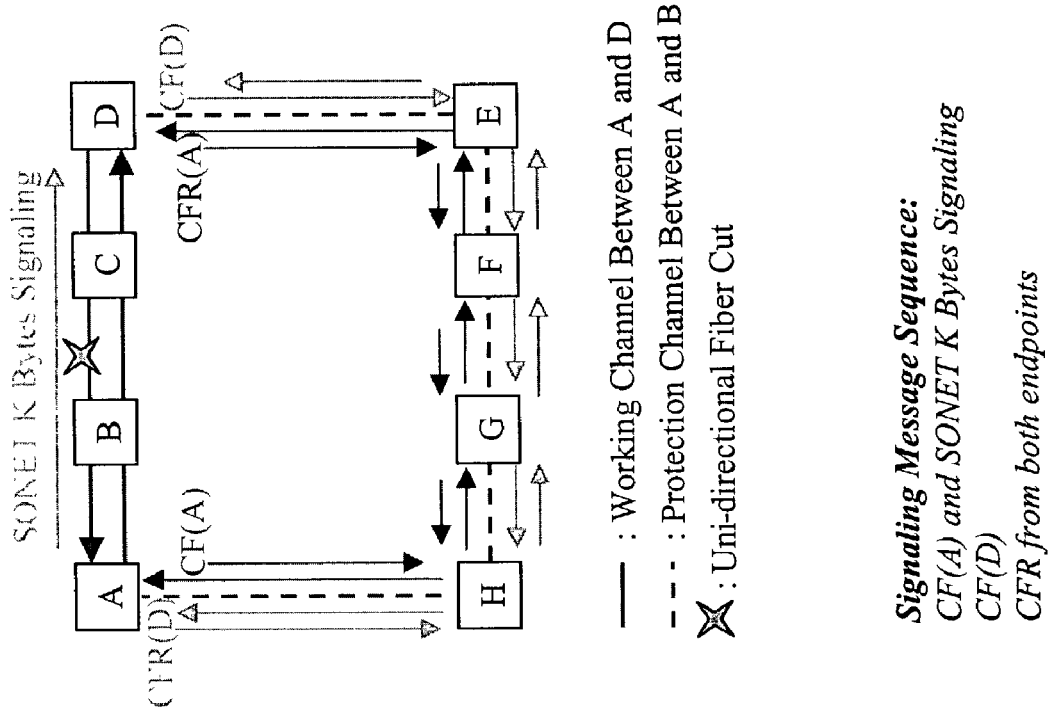
Figure 3 - Signaling Message Flows in response to a Uni-directional Fiber Cut

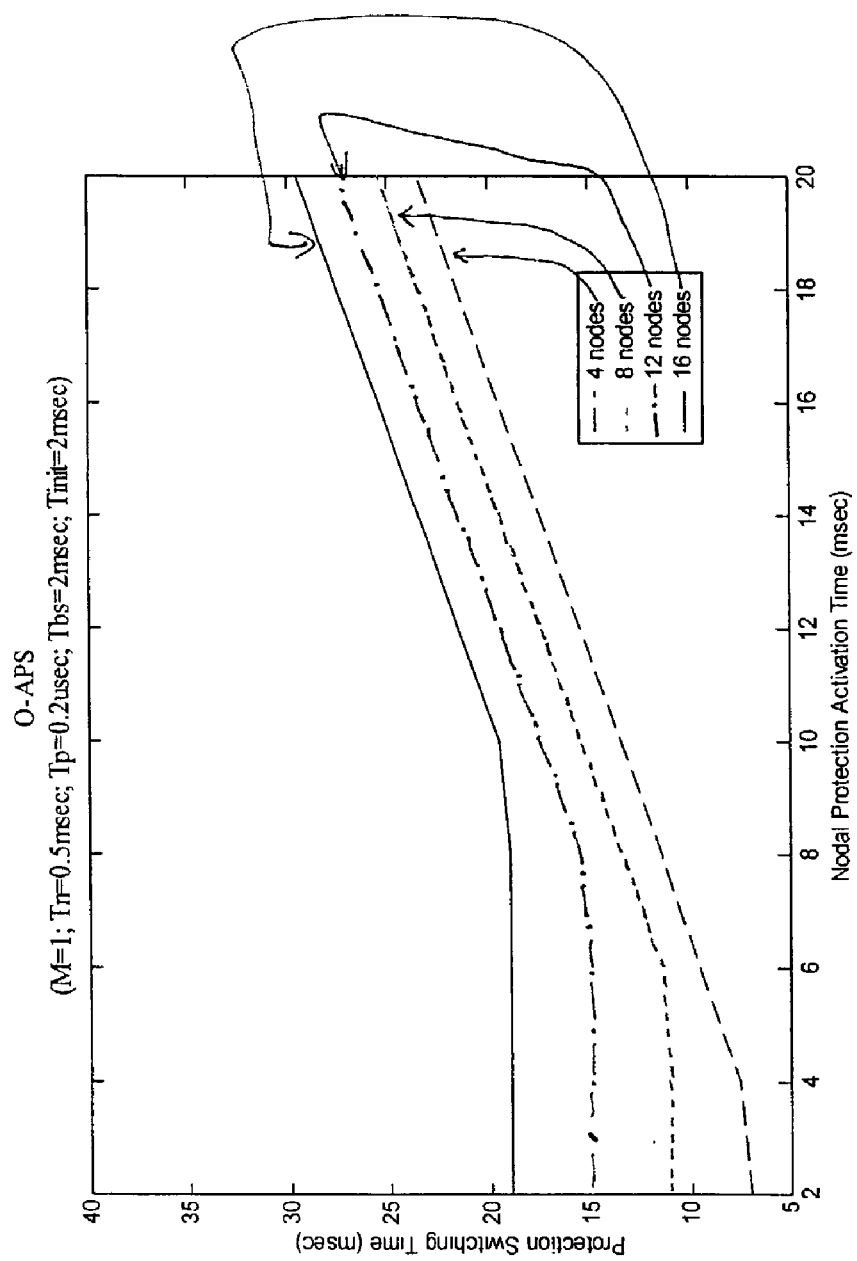
Figure 4A - Sensitivity to Nodal Protection Activation Time ($T_n$=0.5msec)

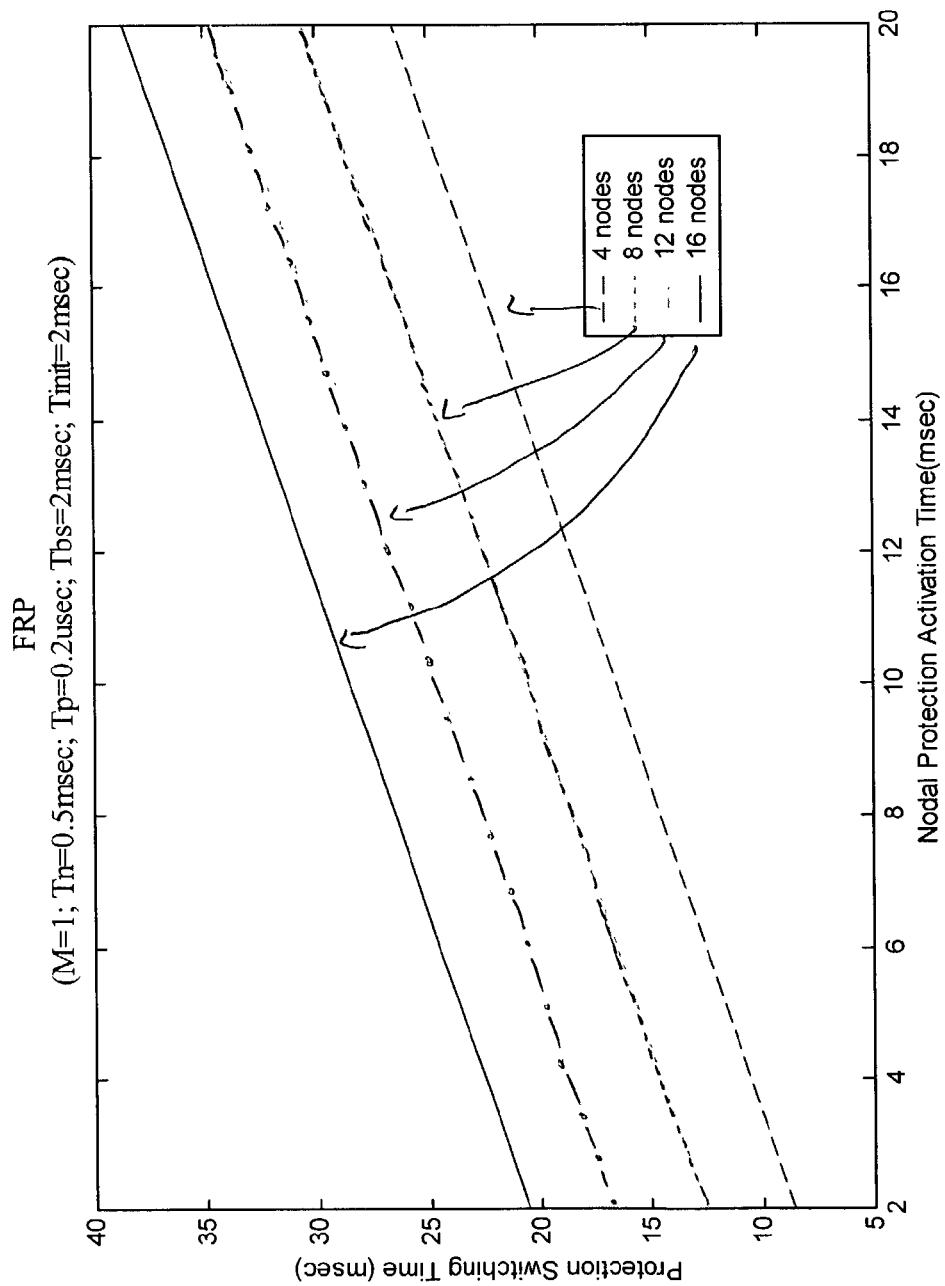
Figure 4B - Sensitivity to Nodal Protection Activation Time (Tn=0.5msec)

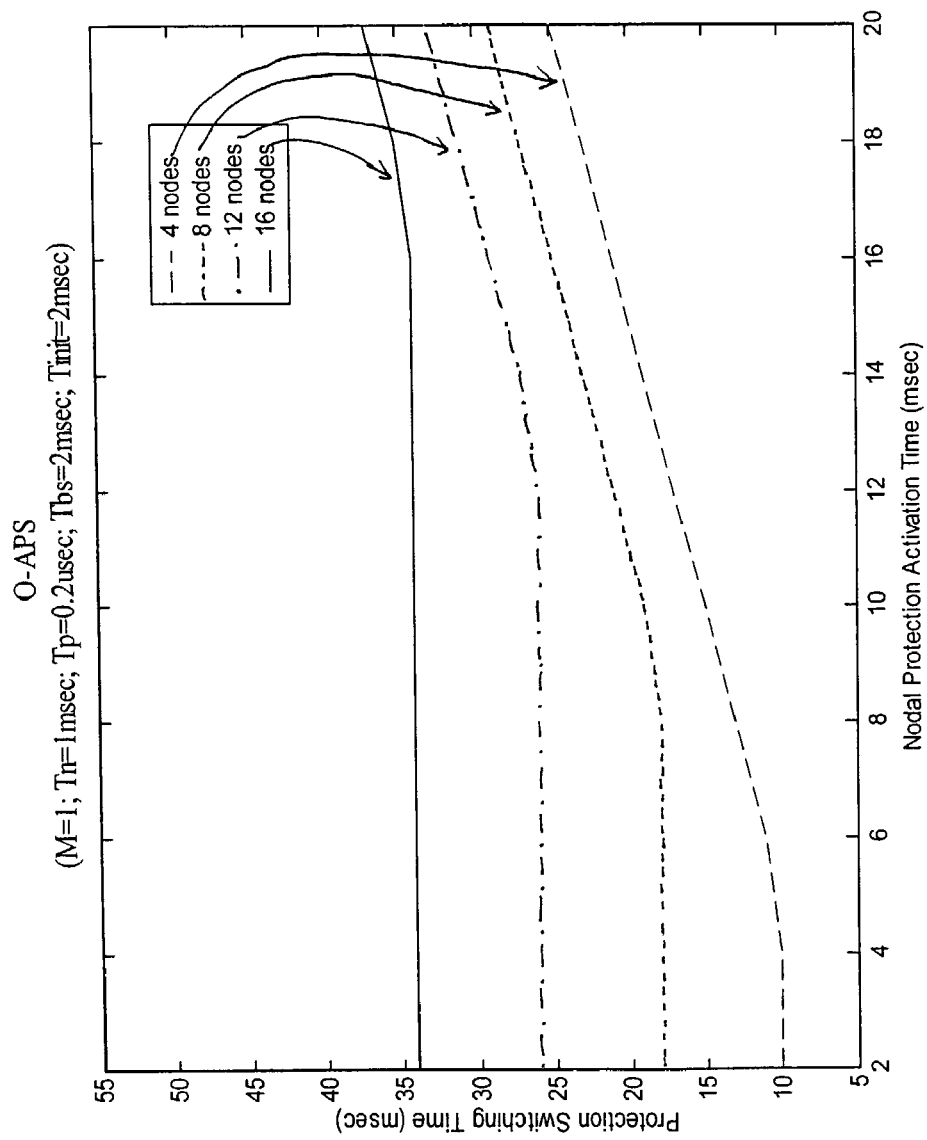
Figure 5A - Sensitivity to Nodal Protection Activation Time (Tn=1msec)

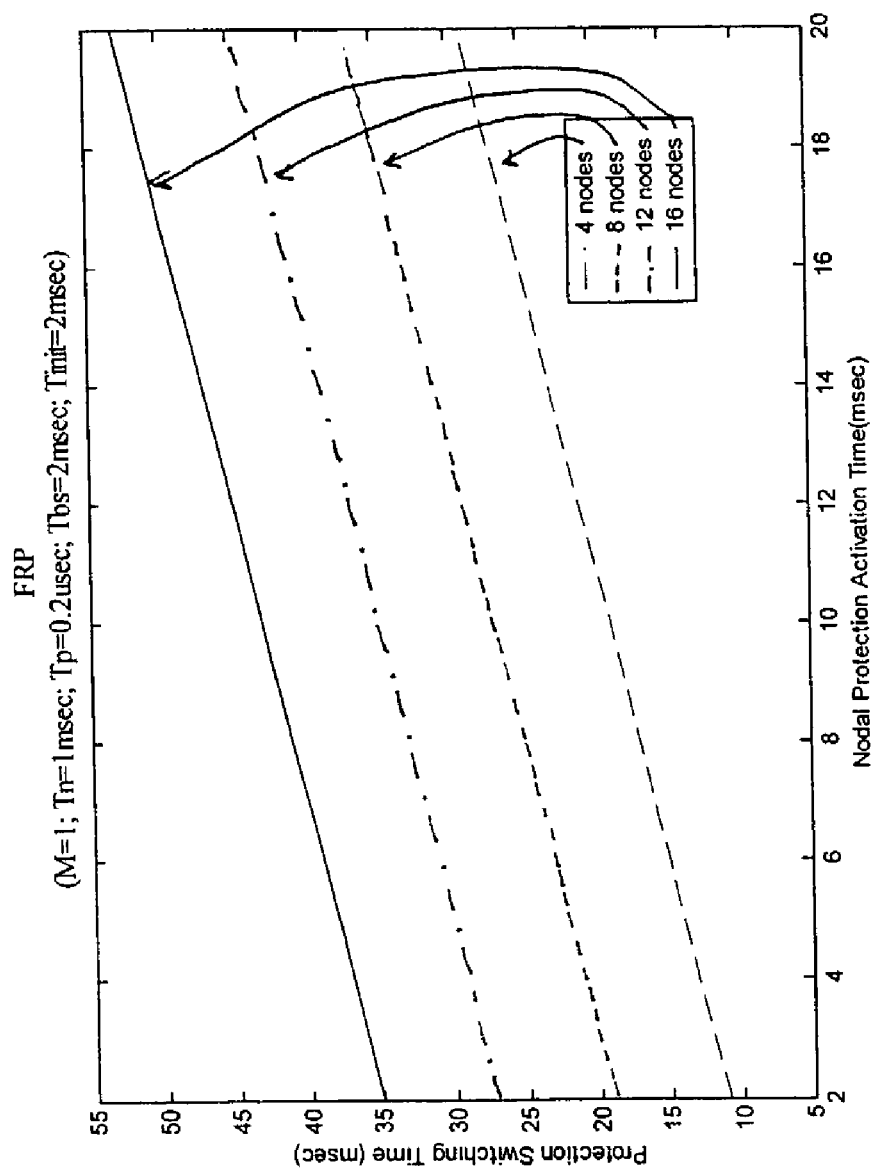
Figure 5B - Sensitivity to Nodal Protection Activation Time (Tn=1msec)

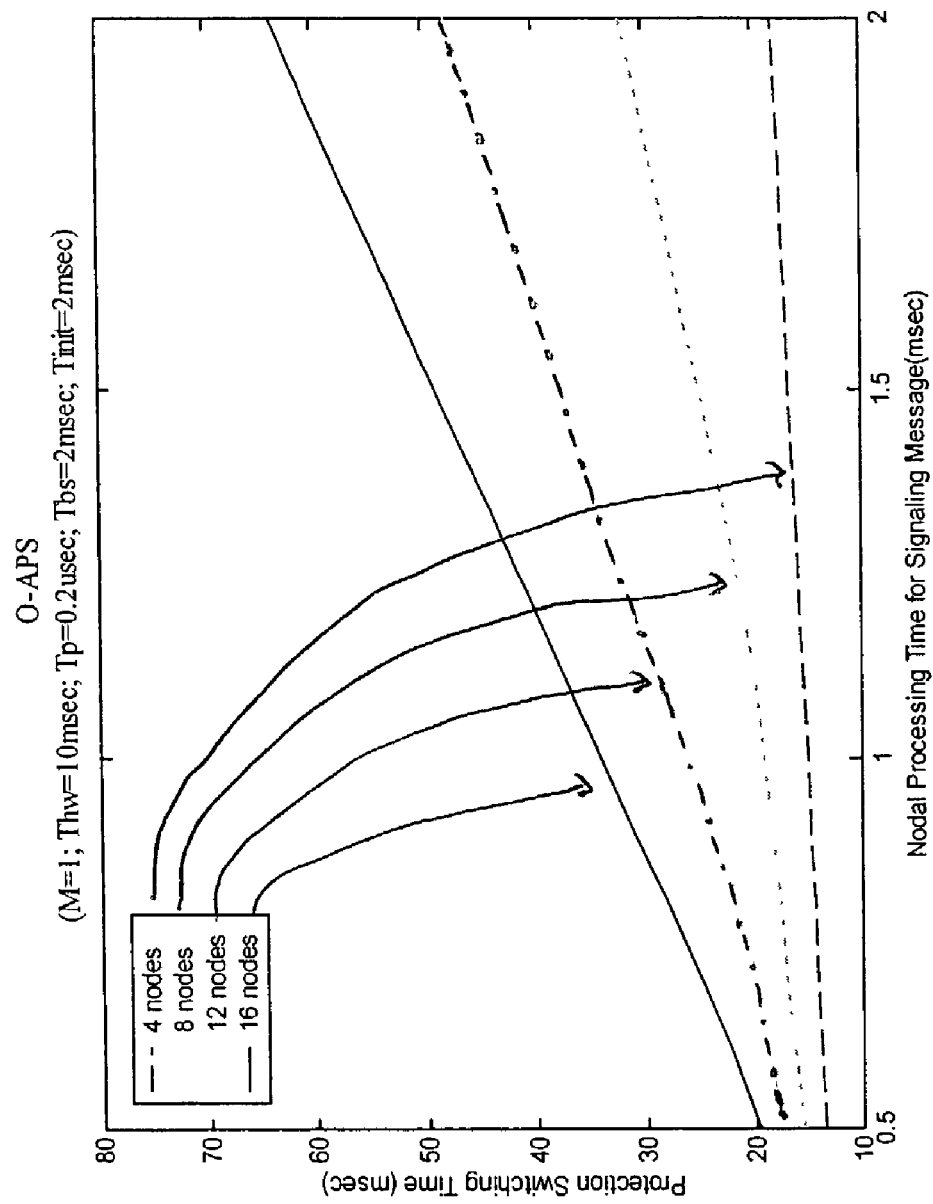
Figure 6A - Sensitivity to Nodal Processing Time of Signaling Message

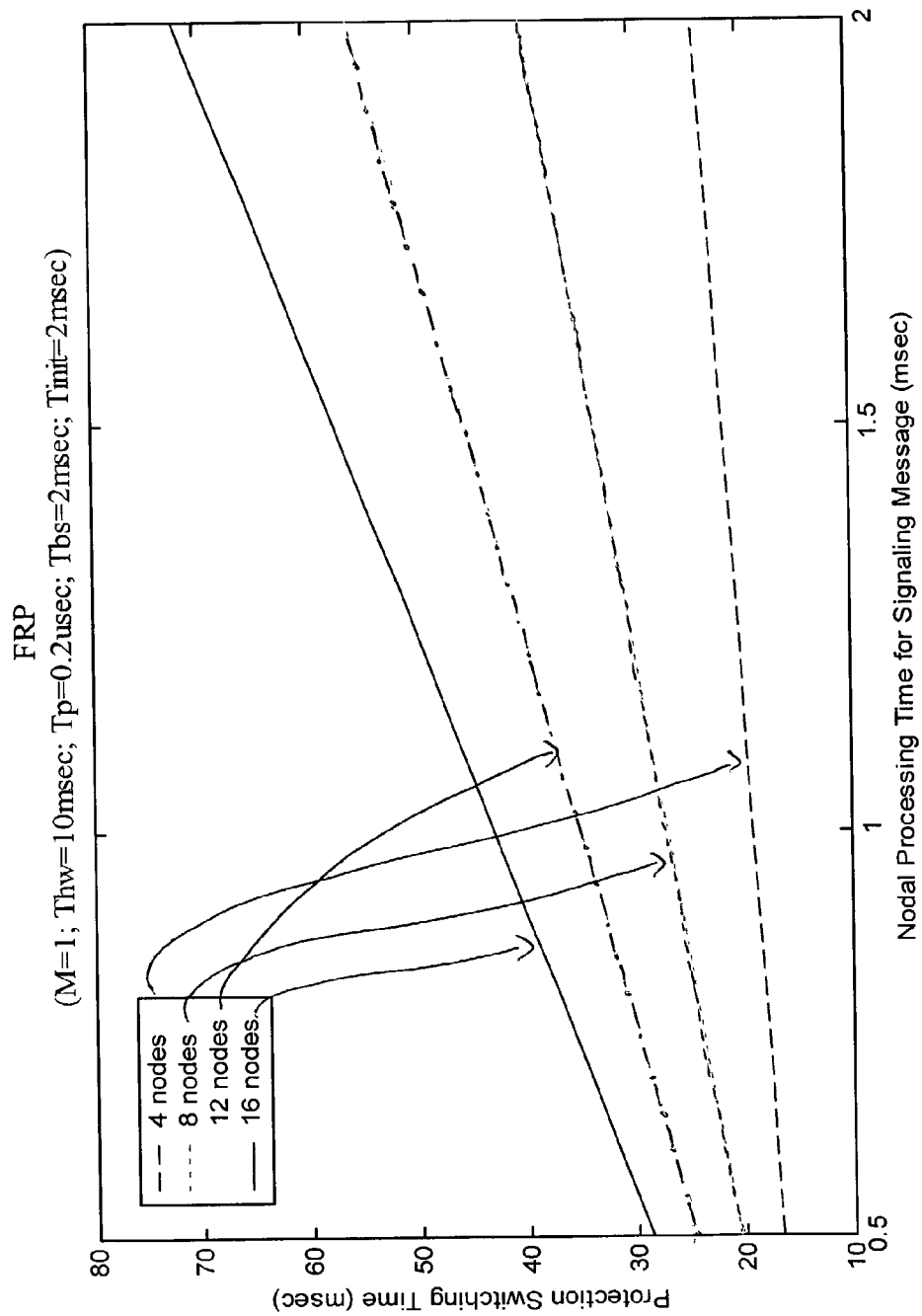
Figure 6B - Sensitivity to Nodal Processing Time of Signaling Message

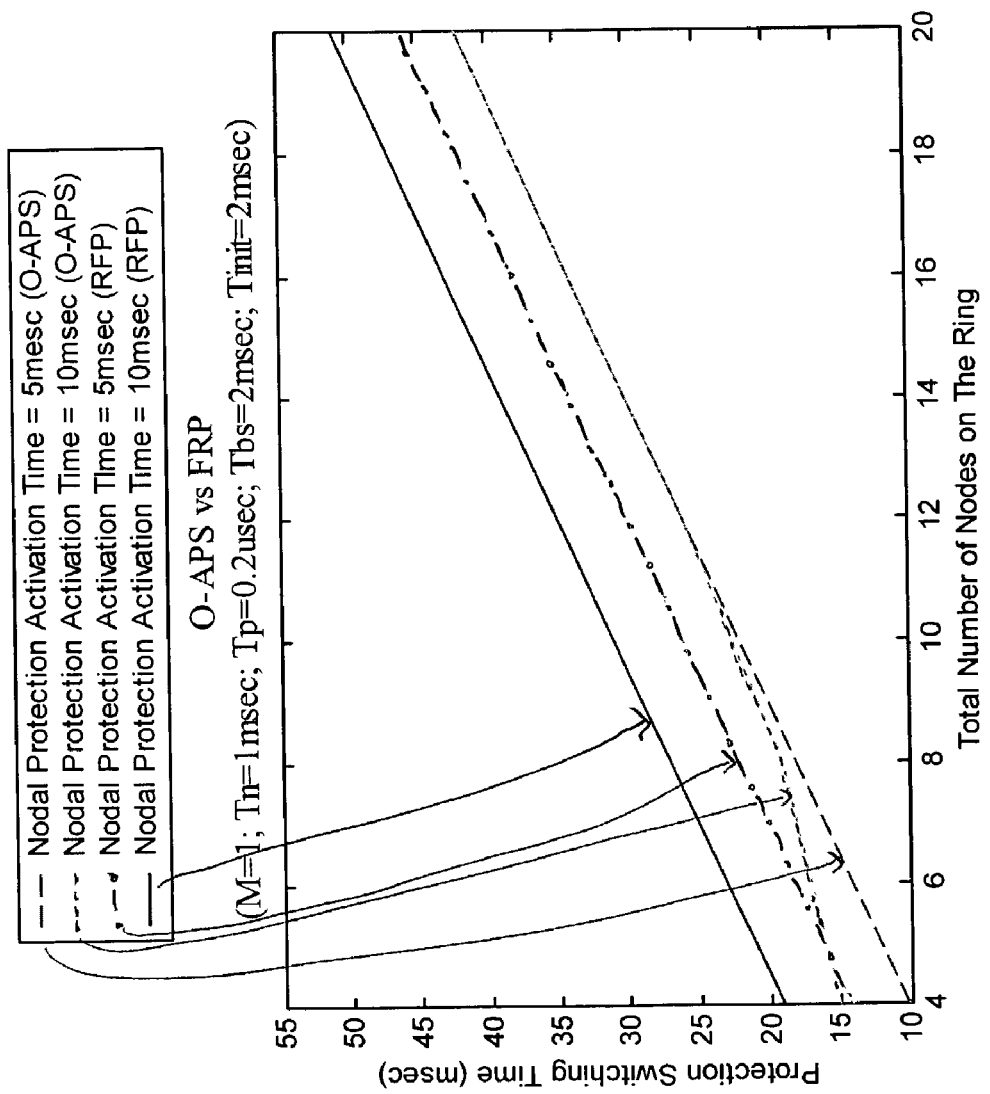
Figure 7 - Sensitivity to Number of Nodes

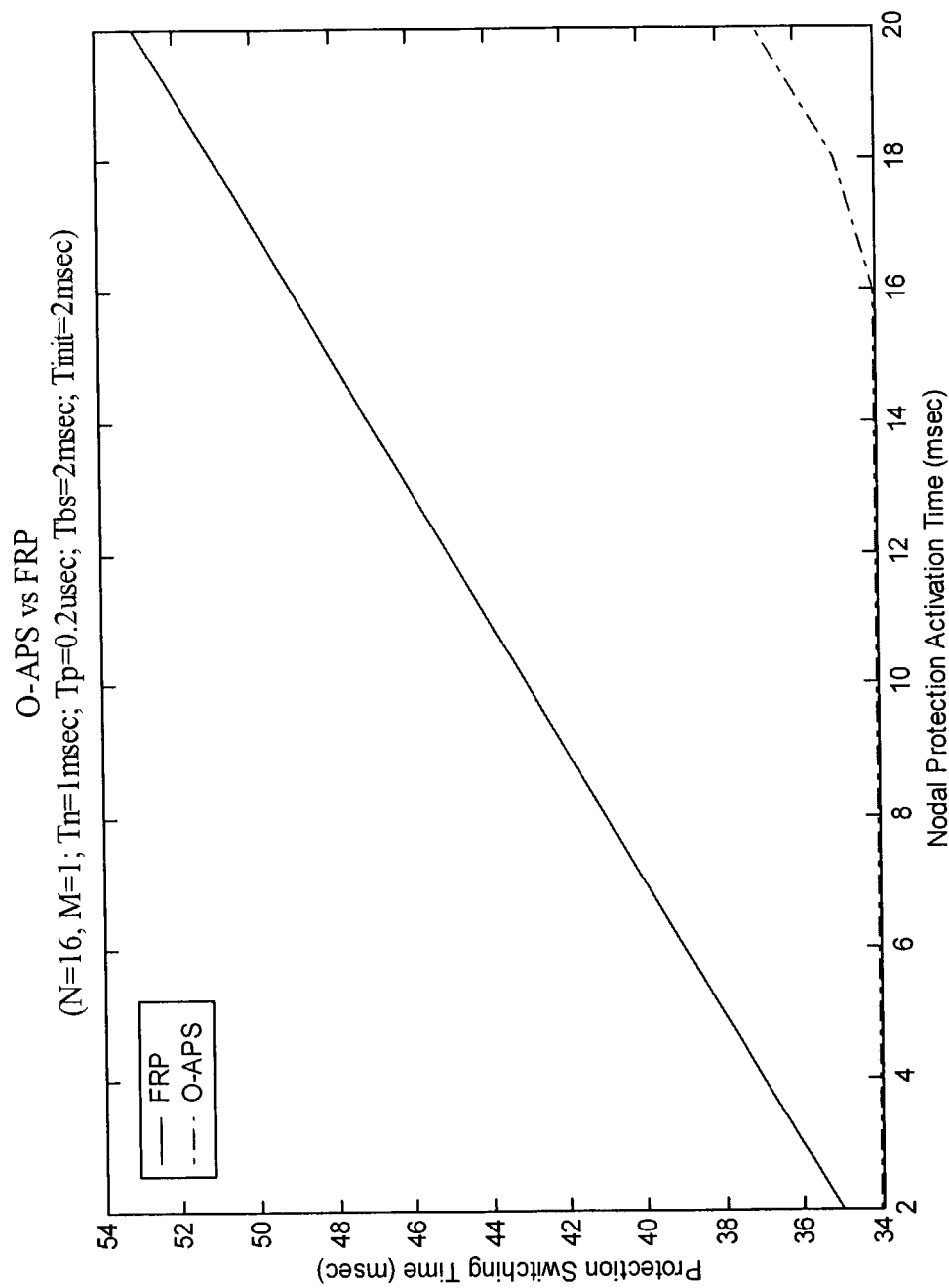
Figure 8A - Comparisons Between O-APS and FRP

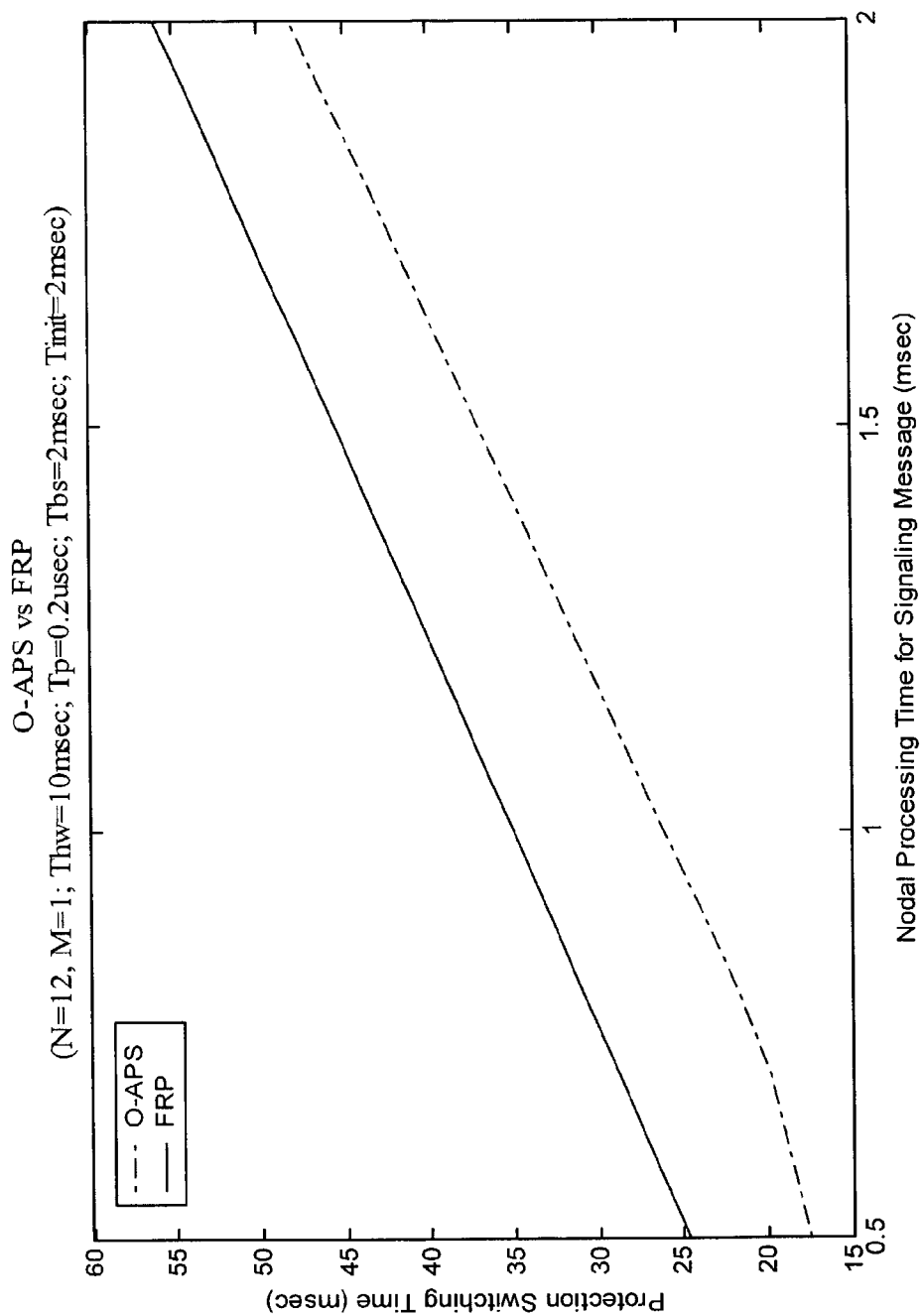
Figure 8B - Comparisons Between O-APS and FRP

METHOD AND APPARATUS FOR PROCESSING PROTECTION SWITCHING MECHANISM IN OPTICAL CHANNEL SHARED PROTECTION RINGS

RELATED APPLICATIONS

This application claims the benefit of U.S. Provisional Application No. 60/306,710 filed on Jul. 20, 2001 by the same inventors. This application is also related to U.S. patent application Ser. No. 10/199,999, which is filed concurrently herewith and is hereby incorporated by reference as if repeated herein in its entirety, including the drawings.

FIELD OF THE INVENTION

The present invention relates generally to optical communications networks, and more particularly to an optical communication network including optical channel shared protection rings.

BACKGROUND

Current and next generation optical networks are capable of transporting multiple wavelengths on the same fiber by using Dense Wavelength Division Multiplexing (DWDM) technology. Typical systems are capable of transporting thirty-two or more wavelength channels, at ten Gigabits per second (Gb/s) rate each. With capacities exceeding 320 Gb/s per fiber, it is becoming increasingly efficient and economical to perform protection and restoration of traffic in the optical layer. In fact, a major network failure, such a fiber cut or node failure, would impact an extremely large number of client layer devices (e.g., ATM switches or IP routers), making service layer protection intractable.

Many networks today are based upon fiber-ring architectures, as evidenced by the proliferation of SONET/SDH time-division multiplexing (TDM) rings all the way from the long-haul backbone to the metropolitan and regional areas. Most large backbone rings represent significant investments on the part of service providers, and expectedly will have longer lifetimes. As a result, ring architectures will clearly play a major role in the evolution of optical networks. Given this large, entrenched base of ring topologies, currently many optical communication network operators are planning for a migration to equivalent dynamic optical ring architectures. Dynamic optical rings can be defined as fiber rings with dynamic light-path provisioning capabilities (such as routing, add/drop and protection). These optical wavelength routing rings, commonly also referred to as optical add-drop ring multiplexer (O-ADM) rings, will form the mainstay architecture for most metro/regional and even long-haul networks, helping operators ease their transition to future optical (mesh or hybrid ring-mesh) networks.

Since many operators have significant experience in deploying and maintaining SONET/SDH rings, future optical analogs of such TDM ring switching are of great transitional value. In optical rings, wavelength channels (as opposed to TDM circuits) undergo bypass, add, or drop operations at ring network elements.

A need exists for fast, scalable optical layer protection/restoration mechanisms. Individual channels (i.e., timeslots) in SONET/SDH rings (e.g., in Bidirectional Line Switching Ring or BLSR architectures) can be restored in 50 ms in the case of a "clean" ring that does not carry extra traffic, or in 100 ms if extra traffic is present in the ring.

Undoubtedly, optical ring solutions must provide equivalent, or improved, capabilities in order to replace SONET/SDH rings in a timely manner. Since each fiber (or wavelength) in an optical network can now carry a much higher degree of multiplexed traffic, Automatic Protection Switching (APS) capabilities are even more crucial It is also of paramount importance for any optical layer protection mechanism that the mechanism be scalable. In other words, the end-to-end restoration time must depend as little as possible on (and ideally must be independent of) the number of nodes in the ring, and of the number of wavelengths that the ring carries, and that in a worse case scenario might need to be restored.

OCh/SPRING Architectures

Optical Channel Shared Protection Ring (OCh/SPRING) architectures provide a protection mechanism that can protect each optical channel individually based on optical channel failure indications. In OCh/SPRING, protection resources (e.g., wavelengths around the ring) can be shared. That is, the same protection wavelength can be used to protect multiple disjoint working channels. In addition, extra traffic (such as unprotected, pre-emptable traffic) can be provisioned on the protection wavelengths; under normal network fault-free condition, both working and extra traffic is carried by the ring, achieving a bandwidth multiplication effect.

OCh/SPRING implements bi-directional protection switching. Bi-directional protection switching refers to a protection switching architecture where for a unidirectional failure (i.e., a failure affecting only one direction of the transmission), both directions, including the affected direction and the unaffected direction, are switched to the protection. Upon the detection of failure, OCh/SPRING requires a signaling protocol, an Optical Automatic Protection Switching (O-APS) protocol, to coordinate the switching from the working channels to the protection channels between the two termination nodes.

There exists a need for a ring-specific O-APS protocol. There have been some recent attempts to design protection mechanisms for generalized mesh topologies and then apply them to ring topologies, with the argument that a ring topology is just a degenerated case of mesh. In this approach the required protocols and algorithms for protection are not designed for the specific case of a ring topology. Although it is true that such mechanisms can be applied to ring topologies, from a practical perspective, this is not the best possible approach. For example, in the appendix we show the performance and scalability issues that result of applying a proposed mechanism called Fast Reroute Protocol (FRP) [BALA]—which we use as an example of restoration mechanism designed for generalized mesh topologies—to an optical ring topology.

In that analysis, it is shown that imposing the solution proposed in [BALA] onto an optical ring that supports OCh/SPRING results in a linear growth of the protection switching time subject to packet processing delay at each nodes and to the time for activating protection at each nodes—that will be referred as nodal protection activation time—as well as the number of nodes on the ring. Given the fact that OCh/SPRING technology allows wavelength reuse, the linear growth of the protection switching time will limit the ring size in terms of number of nodes that can reside on rings and the traffic demands that a ring can accommodate so as to meet the strict protection time requirement. It will also force one to increase the number of interconnected rings for a given set of traffic demands while alternately one could have larger rings with less number of interconnected rings, which is considered to have more dramatic cost implications.

Some techniques for performing protection switching in optical networks employ multiple messages, thereby potentially overwhelming the message channel bandwidth in certain instances.

The present invention is therefore directed to the problem of developing a method and apparatus for controlling the messages used in performing protection switching in an optical network.

SUMMARY OF THE INVENTION

The present invention solves these and other problems by providing, inter alia, a method for processing protection switching messages that merges protection switching/signaling messages destined for a common location.

BRIEF DESCRIPTION OF THE DRAWINGS

FIGS. 1A-B depict two views of an exemplary optical ring; one view is a physical view and the other view is a logical view.

FIG. 2 depicts an exemplary embodiment of a flow of messages in an optical ring in response to a bi-directional fiber cut according to one aspect of the present invention.

FIG. 3 depicts an exemplary embodiment of a flow of messages in an optical ring in response to a uni-directional fiber cut according to another aspect of the present invention.

FIGS. 4A-B depict the sensitivity of protection switching time to nodal protection activation time for Tn=0.5 msec, for both Optical Automatic Protection Switching (O-APS) and Fast Reroute Protocol (FRP).

FIGS. 5A-B depict the sensitivity of protection switching time to nodal protection activation time where Tn=1.0 msec, for both O-APS and FRP.

FIGS. 6A-B depict the sensitivity of protection switching time to nodal processing time of a signaling message, for both O-APS and FRP.

FIG. 7 depicts the sensitivity of protection switching time to a number of nodes, for both O-APS and FRP.

FIGS. 8A-B depicts a comparison of protection switching time for O-APS and FRP.

DETAILED DESCRIPTION

Figure 9:
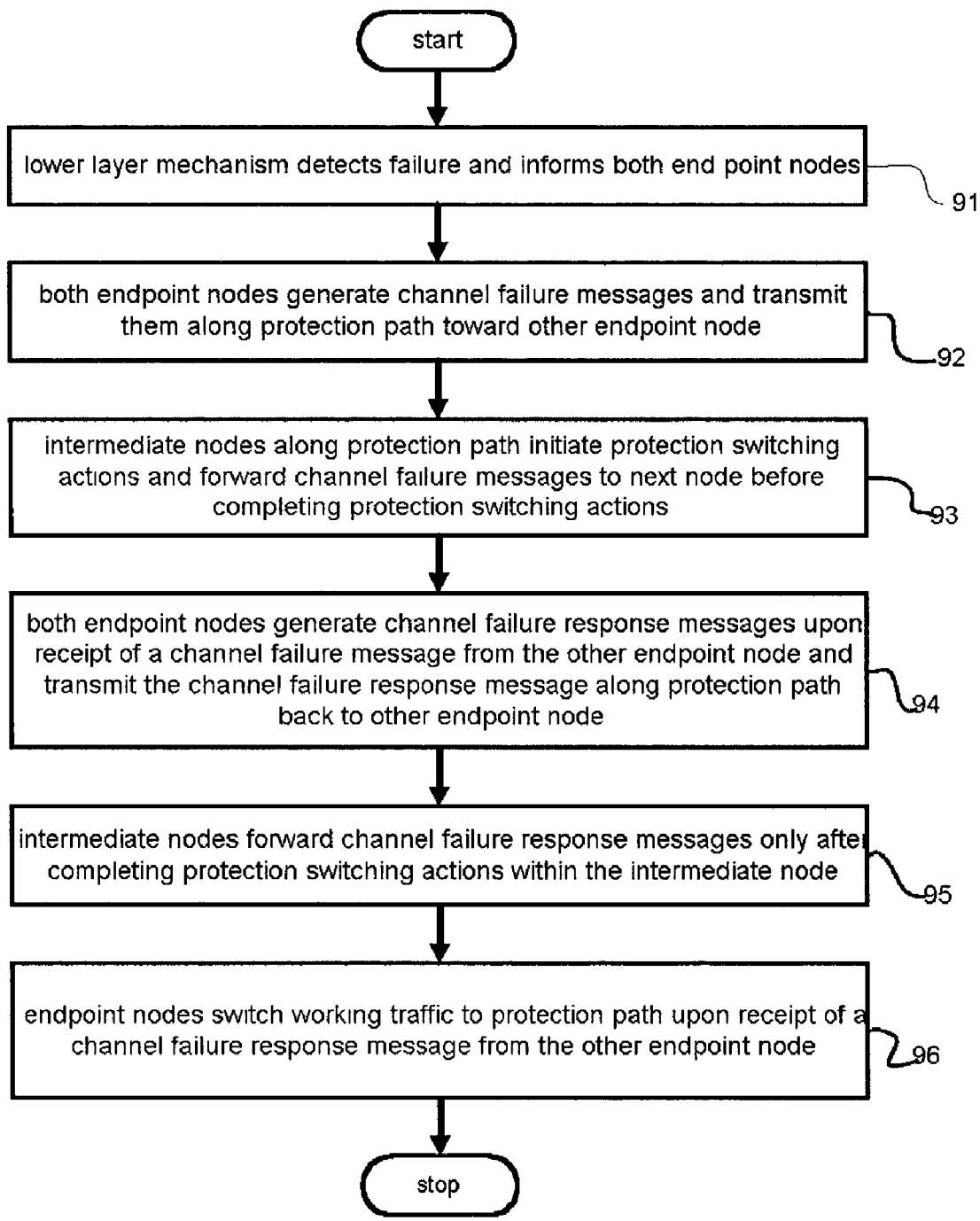
FIG. 9 depicts a flow chart of an exemplary embodiment of the protection switching for a bi-directional failure according to one aspect of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

SUMMARY OF EXEMPLARY EMBODIMENT

An exemplary embodiment of the present invention for an Optical Automatic Protection Switching mechanism is designed for protection switching of Optical Channel Shared Protection Rings (OCh/SPRING). More specifically, the embodiment is applicable to optical rings built from flexible Optical Add-Drop Ring Multiplexers (OADMs). The exemplary embodiment achieves fast, scalable, end-to-end restoration in OCh/SPRING architectures by employing the following techniques:

1. Parallel or simultaneous node configuration and wavelength switching: this capability assumes that switching from the working link to the protection link bi-directionally does not require sequential hardware configuration actions from the source to destination (or vice versa).

2. Optimized nodal behavior in response to the protection switching signaling that reduces holding times at each node, improving the end-to-end restoration performance. For those optical devices with slow provisioning times, the exemplary embodiment reduces dependency of the total protection switching time with respect to the configuration/switching time at each individual node.

3. For uni-directional failures, use of a special failure notification mechanism for the destination node to quickly notify the source node of the failure.

4. An optimization scheme introduced to further minimize the signaling overhead by merging signaling messages.

5. Use of a lightweight 1P-based signaling mechanism for the protection mechanism.

DESCRIPTION

Without losing the generality, we consider an optical ring as shown in FIG. 1. The physical topology includes two counter-rotated fiber rings, in which light travels uni-directionally along each fiber. The logical ring topology is constituted by bi-directional links between nodes. A bi-directional link is realized by two uni-directional physical fibers. An example is shown in FIG. 1. The example shows an Optical Channel Shared Protection Ring (OCH/Spring) circuit between two endpoints A and D. Its working channel traverses nodes ADCD and its corresponding protection channel travels along nodes DEFGHA. Working and protection channels are carried on different wavelengths.

Whenever a failure is detected at any endpoints, the Optical Automatic Protection Switching mechanism will be invoked. Both bi-directional and uni-directional failures are taken into account in this mechanism.

According to one exemplary embodiment of the present invention, an IP based common control channel exists between any adjacent nodes. Moreover, two end nodes reside within the same protection domain. Furthermore, failure detection is end-to-end, and relies on the lower layer failure detection mechanisms that could be vendor specific. Finally, provisioning for the switching from the working to the protection bi-directionally can be initiated from both end nodes, and does not have to be sequential from the source to destination. This translates to a requirement where the protection wavelength and port information are reserved and fixed and each node can do provisioning or switching from the working to protection independently. Thus, each node includes all necessary information to perform its protection switching actions, including knowledge of all incoming port mappings, all outgoing port mappings, and all reserved wavelengths. For those applications that operate in the electrical domain, the reserved frequencies must also be known in the node.

Protocol Description for Exemplary Embodiment of Optical Automatic Protection Switching Case 1: Bi-Directional Failure First, we discuss the messaging flow in response to bi-directional failure, such as a bi-directional fiber cut. Assume that after a bi-directional fiber cut between nodes B and C, both endpoints A and D detect a failure via a lower layer mechanism that is vendor specific. Upon detecting the failure, both endpoint nodes (A and D) initiate protection switching by generating channel failure (CF) messages toward each other along the protection path (e.g., the long path). Thus, protection switching is initiated from both ends simultaneously, or nearly so depending upon the relative notifications of the failure by the lower layer mechanisms.

All nodes on the protection path including both end nodes and intermediate nodes will perform following tasks. Upon receiving the first channel failure message, regardless of where it is originated, each node initiates protection switching actions for both directions and forwards the channel failure message to the next node uni-directionally. The channel failure message can either be forwarded prior to initiating protection switching actions or after do so. But in either case, the channel failure message propagation is not delayed while protection switching actions are occurring in each node. This ensures rapid notification of all nodes in the optical network, hence reducing the delays. Rather than waiting in sequential fashion for each node in the network to complete protection switching actions before even notifying the next node in the network, this embodiment forwards the channel failure message to the next node. This reduces the total protection switching delay time from a sum of the individual delays in each node to the delay of the slowest node, plus the signaling time to reach the slowest node and the processing time at each node.

Upon receiving the second channel failure message, regardless of where it is originated, each of the nodes forwards the second channel failure message to the next node uni-directionally. Given that the node did not forward the first received channel failure response message until all protection switching actions in the node were complete, this second channel failure response message need not be delayed.

According to this embodiment, the corresponding Channel Failure Response (CFR) messages will be initiated at end nodes if and only if the following two conditions are both met. First, protection switching actions for both directions are completed. Second, a channel failure message that was originated from the other end node has arrived.

The channel failure response messages will not be forwarded in the intermediate nodes unless protection switching actions for both directions are completed. In other words, all intermediate nodes will perform following actions. First, upon receiving the first channel failure response message, the intermediate node checks whether associated protection switching actions for both directions are completed. If the answer is yes, then the intermediate node forwards the channel failure response message to the next node in the protection link (unless of course this is the second of the two channel failure response messages to be received by the intermediate node). Otherwise the intermediate node waits until associated protection switching actions for both directions are completed and then forwards the channel failure response message to the next node.

Upon receiving the second channel failure response message, the intermediate node forward the second channel failure response message to the next node. This can be done without delay, as the intermediate node has by definition completed its protection switching actions due to its response to the first received channel failure response message.

Basically, an end node sends out a channel failure message and the end node claims the completion of protection switching only after it receives a channel failure response message and only then switches the working traffic to the protection channel. And the far-end node sends the channel failure response message and the intermediate nodes forward the channel failure response message, only after the appropriate protection switching actions are completed in both directions at the respective nodes. So, when the channel failure response message reaches the end node that generated the channel failure message, it is safe to switch working traffic to protection channel at that end node.

According to one embodiment of the present invention, a timer is started when an end node sends out a channel failure message. If the timer expires before that particular end node gets its channel failure response message back, then the end node will know something is wrong and protection switching cannot be completed.

FIG. 2 demonstrates how messages are being forwarded during the protection switching process for bi-directional failure. Note that CF(A) stands for the case where a channel failure message is originated from end node A; and CFR(A) stands for the corresponding channel failure response message.

FIG. 9 depicts an exemplary embodiment 90 of a method for performing protection switching in flow chart summary form. In step 91, a lower layer mechanism detects failure and informs both endpoint nodes. The detection mechanism can vary according to vendor equipment.

Next, both endpoint nodes generate channel failure messages and transmit them along protection path toward other endpoint node (step 92). These failure mechanisms may be transmitted at slightly different times, depending upon the mechanism that detects the failure and its relationship to the endpoint nodes, as well as the processing variations in the two endpoint nodes. Nevertheless, these two endpoint nodes will initiate protection switching as quickly as possible from both ends of the protected link.

Intermediate nodes along the protection path initiate protection switching actions and forward all received channel failure messages to the next node in line along the protection path before completing protection switching actions within the intermediate nodes (step 93). This ensures that notification to the intermediate nodes of the failure is not delayed due to protection switching actions within each intermediate node.

Both endpoint nodes generate channel failure response messages upon receipt of a channel failure message from the other endpoint node and transmit the channel failure response message along protection path back to other endpoint node (step 94).

Intermediate nodes forward channel failure response messages only after completing protection switching actions within the intermediate node (step 95). This ensures that when the endpoint node finally receives a channel failure response message, the endpoint node can safely switch working traffic to the protection path.

Of course then, the endpoint nodes switch working traffic to the protection path upon receipt of a channel failure response message from the other endpoint node (step 96) and the process is complete.

Case 2: Uni-Directional Failure

For a uni-directional fiber cut, only the end node on the receiving side of the uni-directional failure can detect the failure. After detecting a failure, the end node on the receiving side of the uni-directional failure will initiate the protection switching action by generating a channel failure message towards the source along the protection path (e.g., the longer path) and immediately notify the other end node via working channel, e.g., the short path, by sending, e.g., a SONET K-byte short path signal toward the other end.

The time to take for the other end node to be notified will be the time of composing the K-byte signaling, plus the propagation delay of speed of light and the processing delay at the receiving end. As soon as the other end node receives the K-byte signal, the other end node sends out the channel failure message along the protection path. It is very unlikely that an end node X receives a channel failure message from the other end node Y on the long path before it receives K-byte short path signal.

In case the above rare case happens for a very small ring, such as an optical ring of three nodes, the CFR(X) message will not be sent out in response to CF(X) unless all protection switching actions are completed properly at node Y. According to the design logic of the exemplary embodiment of the optical automatic protection switching, the protection switching actions for both directions at node Y will occur as soon as node Y receives CF(X) even if node Y has not yet been notified by node X via its K-byte short path signaling. It is safe for node Y to send CFR(X) before sending CF(Y) as long as protection switching action has been completed at node Y because the nodes along the protection path have already initiated their protection switching actions in response to CF(X) and will not forward CFR(X) until these protection switching actions are complete.

FIG. 3 demonstrates how messages are being forwarded during the protection switching process for uni-directional failure. Note that CF(A) represents a channel failure (CF) message that is originated from end node A, while CFR(A) represents a channel failure response message (CFR) generated in response to a channel failure message from node A (CF(A)).

Figure 10:
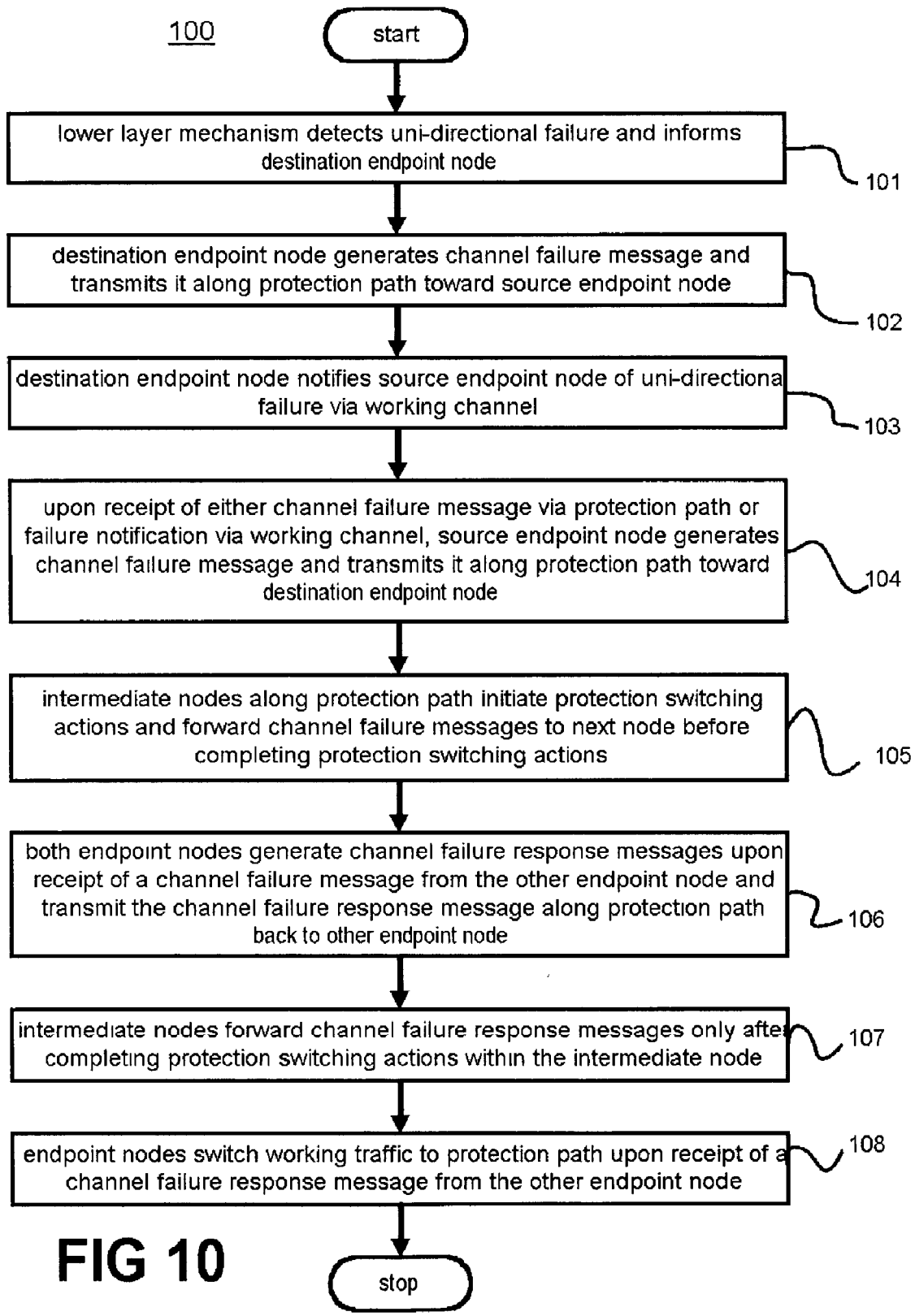
FIG. 10 depicts a flow chart of an exemplary embodiment of the protection switching for a uni-directional failure according to another aspect of the present invention.

FIG. 10 depicts an exemplary embodiment 100 of a method for performing protection switching for the uni-directional case in flow chart summary form. In step 101, a lower layer mechanism detects a uni-directional failure and informs the destination endpoint node. The detection mechanism can vary according to vendor equipment.

Next, the destination endpoint node generates a channel failure message and transmit it along the protection path toward the source endpoint node (step 102). In addition, the destination endpoint node notifies the source endpoint node via a working channel about the failure (step 103).

Upon receipt of either the channel failure message from the destination endpoint node via the protection path or the failure notification from the destination endpoint node via the working channel, the source endpoint node generates a channel failure message and transmits it along protection path toward destination endpoint node (step 104).

Intermediate nodes along the protection path initiate protection switching actions and forward all received channel failure messages to the next node in line along the protection path before completing protection switching actions within the intermediate nodes (step 105). This ensures that notification to the intermediate nodes of the failure is not delayed due to protection switching actions within each intermediate node.

Both endpoint nodes generate channel failure response messages upon receipt of a channel failure message from the other endpoint node and transmit the channel failure response message along protection path back to other endpoint node (step 106).

Intermediate nodes forward channel failure response messages only after completing protection switching actions within the intermediate node (step 107). This ensures that when the endpoint node finally receives a channel failure response message, the endpoint node can safely switch working traffic to the protection path.

Of course then, the endpoint nodes switch working traffic to the protection path upon receipt of a channel failure response message from the other endpoint node (step 108) and the process is complete.

The exemplary embodiments of the present invention for Optical Automatic Protection Switching include multiple aspects. One aspect provided includes parallel or simultaneous node configuration and wavelength switching. According to this aspect of the present invention, the signaling for protection switching is initiated from both end nodes.

Furthermore, in response to the initiation of signaling of protection switching from both end nodes (e.g., as in bi-directional signaling for use in SONET/SDH ring protection architectures, such as BLSR), the embodiment of O-APS allows the initiation of provisioning and configuring protection switching from the working channel or path to the protection channel or path bi-directionally at each node starting from both ends and working towards the middle.

This "parallel" or "simultaneous" provisioning and switching capability assumes that the switching from the working channel or path to the protection channel or path bi-directionally does not require sequential hardware configuration actions from the source node to the destination node (or vice versa). In another words, given a ring network topology and OCh/SPRING architecture, the protection wavelength and port information are reserved and fixed. Moreover, each OADM node has the necessary knowledge to provision the optical switching fabric to do the switching from the working channel to the protection channel without additional input from other nodes or without requiring accessing of information outside the node.

The above method of "parallel" switching can be further generalized to a mesh network for dedicated protection schemes, in which each OXC can provision the cross connection to switch from the working channel to the protection channel independently because it has already the knowledge about the dedicated resource (e.g., wavelengths) and the incoming and outgoing port mappings.

According to another aspect of the present invention, the exemplary embodiment for O-APS uses an optimized nodal behavior in response to the protection switching signaling, which reduces holding times at each node, thereby improving the end-to-end restoration performance. For those optical devices with slow provisioning times, the exemplary embodiment for O-APS reduces the dependency of the total protection switching time with respect to the configuration/switching time at each individual node.

In the exemplary embodiment of O-APS, an intermediate node, upon receiving the first channel failure message, will initiate the switching action bi-directionally. It does not wait till the completion of the action before it forwards channel failure message uni-directionally to the next node.

In contrast to that action taken in response to a channel failure message, an intermediate node, upon receiving the first channel failure response message, will check to make sure that its switching action is complete before it forwards the channel failure response message uni-directionally to the next node in the protection path. For those devices with slow provisioning times, the embodiment of O-APS makes the total protection switching time less dependent upon the provisioning/configuration/switching time at each individual node. In long protection paths, this embodiment of the present invention significantly reduces the delays by removing the sequential dependencies and converting them to operations that occur generally in parallel. Thus, the rate limiting step now becomes the slowest provisioning node (i.e., the node that takes the longest to complete its protection switching) rather than the sum of the times of all nodes in the protection path.

According to yet another aspect of the present invention, in the case of a uni-directional fiber cut or failure, an embodiment of the O-APS uses a special failure notification mechanism for the destination node to quickly notify the source node of the failure. As by definition, there exists a working channel from the destination node to the source node (but not from the source node to the destination node), the destination can use the shortest path from itself to the source node to notify the source node of the failure as quickly as possible.

As only the end node on the receiving side of the uni-directional failure can detect the failure, the source node must be informed. After detecting a failure, the end node on the receiving side of the uni-directional failure (i.e., the destination node) will initiate the protection switching action by generating a channel failure message and sending the channel failure message towards the source node along the protection path (the longer path). At the same time, or shortly thereafter or shortly before, the destination node will immediately notify the other end node (i.e., the source node) via a working channel between the source and destination node, i.e., the short path, by sending, for example, a K-byte SONET short path signal, toward the other end.

The time needed for the other end node to be notified will be the time of composing the K-byte signal plus the propagation delay of the speed of light through the network and the processing delay at the receiving end. As soon as the other end node (i.e., the source node) receives the K-byte signal, the source node sends out its channel failure message along the protection path to initiate protection switching along the protection path from its end.

Message Merging

In the performance analysis of the appendix we assumed that there are no channel interactions at nodes in terms of signaling protocol. Moreover, in practice most likely the protection signaling messages will be treated with highest priority when there are resource contentions with other types of signaling messages. However, all protection signaling messages will be treated in a single First In First Out (FIFO) fashion if there are multiple protection signaling messages waiting to be processed in a single node.

Given that channel failure response (CFR) messages are not forwarded until all protection switching actions are completed at corresponding nodes, it is very possible that during the time a CFR waits for completion of protection switching actions for its channel in a particular node, another CFR message could arrive. At this point, there are two possibilities. First, the second arrived CFR might need to wait until protection switching actions are completed in the receiving node, hence there is no rush at least until the corresponding protection switching actions are complete. However, if this CFR message is a second CFR message from another end node, then delaying its forwarding could delay the switching of the working traffic from one of the end nodes. Therefore, some accommodation must be made to prevent this potential delay. It is also possible that the second arrived CFR could have its corresponding protection switching actions completed before the protection switching actions corresponding to the earlier arrived CFR. In this case, there exists the possibility of introducing delay in switching traffic from the first end node that generated the first channel failure message to which the second arrived CFR is responding. This potential delay must also be prevented if possible. Normally, however, regardless of its readiness the later arrival cannot be sent due to the FIFO service discipline among protection signaling messages.

This aspect of the present invention provides for these eventualities. Assuming both of the received CFR messages are traveling along the same direction, without losing information, these two CFR messages can be merged into one single combination message and sent out. The subsequent nodes along the path then check the contents of this combination message and take appropriate actions, as described above. For example, if the combination CFR message requires completion of protection switching actions in the recipient node for multiple circuits, then the combination CFR message is not forwarded until these actions are completed. If the recipient node is a destination node for one of the CFR messages, then the one CFR message is stripped from the combination message before being forwarded. This occurs in addition to whatever actions by the destination node are required in response to the one CFR message, such as switching of the working traffic to the protection path, which switching may be done before or simultaneous with the stripping or forwarding steps.

Another scenario will be the case where multiple circuits detect a failure at the same end node simultaneously. Then there will be multiple CF messages being composed. Furthermore, initiating a CF message from an end node normally takes more time than processing a receiving signaling message. Thus, rather than sending each individual CF message one by one, those multiple channel failure messages can be merged or aggregated into one combination CF message and sent out.

Merging of Channel Failure Messages

Figure 11:
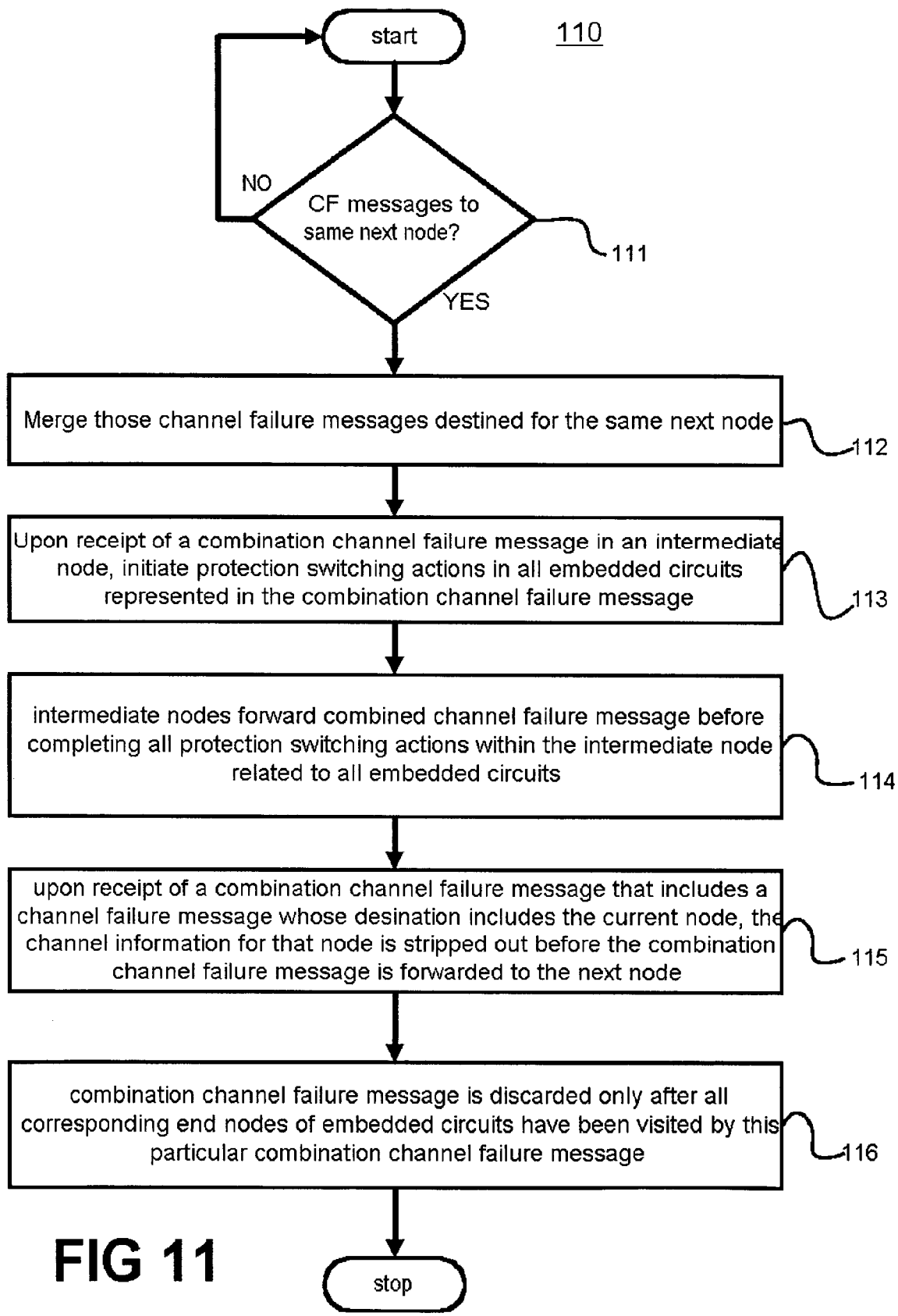
FIG. 11 depicts an exemplary embodiment for merging channel failure messages according to another aspect of the present invention.

Referring to FIG. 11, according to one exemplary embodiment 110 of this aspect of the present invention, merging signaling messages occurs as follows. Multiple channel failure (CF) messages can be merged into one combination channel failure (CF) message as long as they travel on the same direction. In other words, these messages must be traveling to at least the same next node in the optical network (step 111-112).

When an intermediate node receives a combination channel failure (CF) message, the protection switching actions will be initiated for all embedded circuits (step 113). In other words, all actions that would have been taken if the constituent elements of the combination CF message were received separately are taken in response to the combination channel failure message. So, if the combination channel failure message includes three separate channel failure messages for three separate channels or circuits, the protection switching for each of the three separate channels or circuits is initiated in response to this channel failure message. If, however, one of the channel failure messages in the combination channel failure message is redundant to an earlier received channel failure message from a different end point, then the node simply forwards the channel failure message on.

The combination channel failure message is then forwarded to the next node before completing the protection switching actions in the intermediate nodes necessitated by the combined channel failure message (step 114).

When a combination channel failure message includes a channel failure message from one end node related to an end node that has received the combination channel failure message, the corresponding channel failure message is removed (step 115). In this case, the corresponding channel information is stripped out of the combination channel failure message whenever it arrives at its end node.

To ensure that the channel failure messages all reach their appropriate end nodes, the combination channel failure message is not discarded until all corresponding end nodes of embedded circuits have been visited by this particular combination channel failure message (step 116).

Merging of Channel Failure Response Messages

Figure 12:
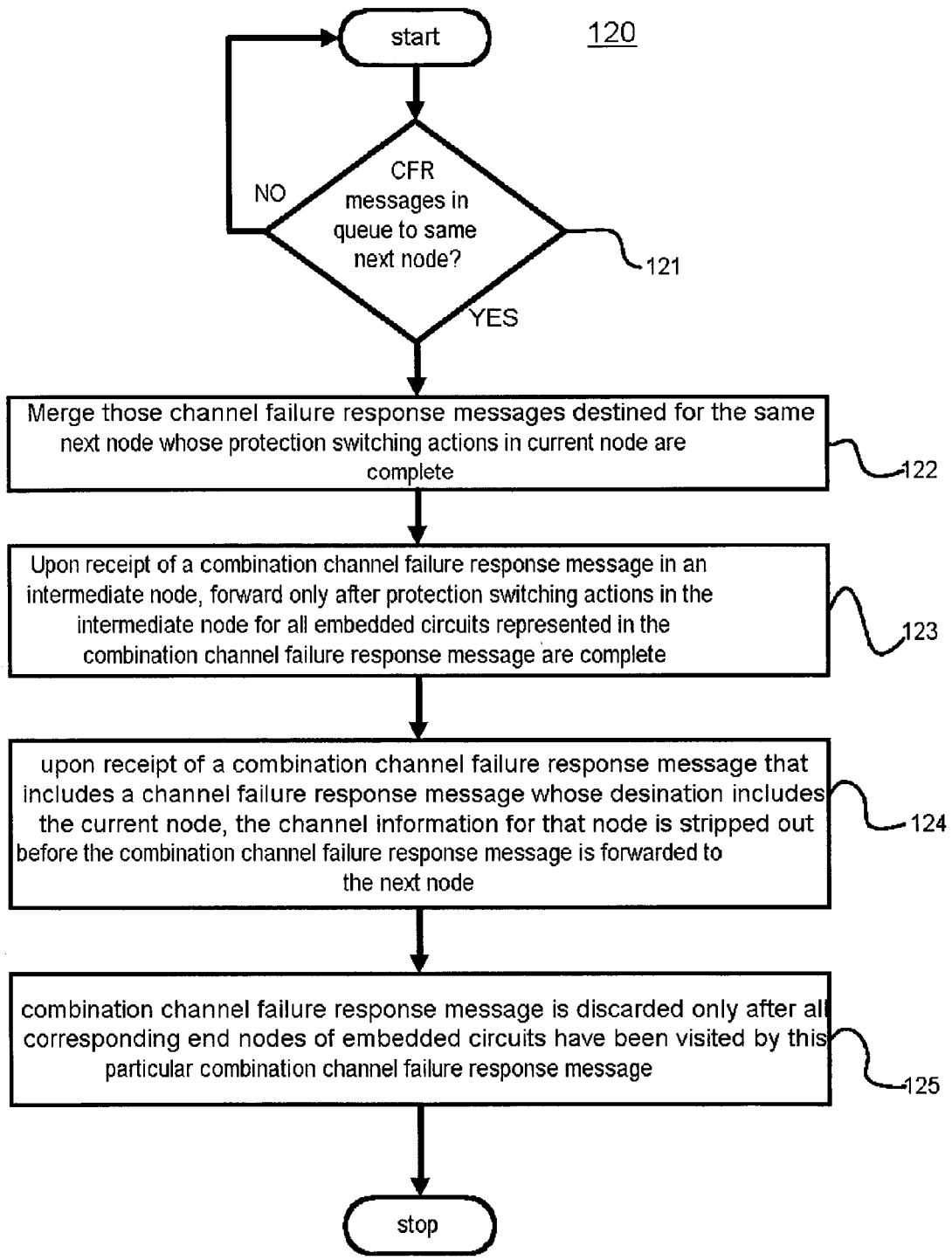
FIG. 12 depicts an exemplary embodiment for merging channel failure response messages according to another aspect of the present invention.

Referring to FIG. 12, according to another embodiment 120 of the present invention, multiple channel failure response (CFR) messages can be merged into one combination channel failure response message when following conditions are met simultaneously. First, all of these channel failure response messages to be merged must all be traveling in the same direction (step 121). In other words, these multiple channel failure response messages must at least be destined for the same next node in the optical network.

The channel failure response message sitting at the head of FIFO queue will determine which other channel failure response messages will be part of the combination channel failure response message whenever it is ready to be sent. For example, the channel failure response message at the head of the queue will merge all other channel failure response messages whose corresponding protection switching actions are complete when the protection switching actions for the channel failure response message at the head of the queue are complete (step 122).

As such, the protection switching actions of corresponding circuits of all other embedded channel failure response messages in the combination channel failure response message must be completed before the combination channel failure response message is ready to be sent out. In some cases, it may be desirable to wait for protection switching actions related to CFR messages other than the CFR message at the head of the queue to be completed before sending out the combination CFR message. But in all cases, the combination CFR message cannot be sent out until all protection switching actions related to all CFR messages in the combination CFR message are complete.

When a combination CFR message reaches an intermediate node, the combination CFR message will not be forwarded until protection switching actions for all embedded circuits are complete (step 123). Given the symmetric nature of O-APS, it is very unlikely that the protection switching actions of those embedded circuits have not been completed when the combination CFR message arrives. Therefore, the chance that merging CFR messages will introduce extra delay is relatively small, simply because the combination CFR message is composed at the bottleneck where all embedded CFR messages have to wait. The waiting period at the node where the combination CFR message was composed also allows subsequent nodes to have more time to finish their protection switching actions before the combination CFR message arrives.

The corresponding channel information will be stripped out of the combination CFR message whenever it arrives at its end node (step 124). In other words, the CFR message intended for a particular end node will be removed from the combination CFR message before sending the combination message on to other nodes in the network. This prevents undue message length and processing.

In all cases, however, the combination CFR message is not discarded until all corresponding end nodes of all circuits related to the CFR messages included in the combination CFR message have been visited by this particular combination CFR message (step 125). This also ensures that all CFR messages reach their appropriate destinations.

In summary, merging signaling messages reduces signaling volume in an optical network. On the other hand, message merging also complicates the message processing process. The performance benefit of message merging becomes more appealing when the number of affected channels increases and the ring size is getting larger.

APPENDIX —PERFORMANCE OF GENERALIZED-MESH RESTORATION APPLIED TO RING TOPOLOGIES FRP

Recently, an Internet Protocol-(IP) based fast restoration protocol (FRP) for optical mesh network has been proposed to the Internet Engineering Task Force (IETF) community as an Internet draft. Two levels of restoration are addressed by FRP, including both local span restoration and end-to-end channel restoration. It is stated that those two levels of restoration can be invoked independently and only one of them may be used.

Considering OCh/SPRING circuits, in this analysis we focus our discussion on the end-to-end channel restoration/protection signaling. In the draft FRP proposal, the end-to-end channel restoration signaling is accomplished by designating an endpoint as a channel owner. It is composed of two sub-cycles: fault indication and protection switching. If the channel owner can detect faults via a lower layer mechanism, the fault indication cycle can be bypassed. The restoration/protection switching along the protection path can only be activated when the signaling message (End-to-End Switchover Request Message) initiated from the channel owner (upon failure detection or receiving failure notification) is being received at intermediate nodes.

Each node, upon receiving the End-to-End Switchover Request, will make appropriate cross connections to setup the protection path. After the action is completed, a node will forward the End-to-End Switchover Request to the next node along the path to the destination node. The restoration/protection cycle is completed when the channel owner receives the response message (End-to-End Switchover Response Message) from another endpoint.

Performance Analysis

In this section we compare the performance of the exemplary embodiment of Optical Automatic Protecting Switching (O-APS) and the above FRP. The performance measure we use is the protection switching time that is defined as the time between the time instance that a failure has been detected at any of two end nodes and the time instance that working traffic has been safely moved on to protection path in an error free protection path setup cycle.

Without losing generality, we assume that each channel behaves independently from others. With this assumption one can ignore the resource contention at nodes among signaling messages and other control messages of different channels. Moreover, to simplify the analysis, we further assume that nodes on a given ring are equally spaced; all nodes exhibit same behavior in response to signaling messages, which also implies that they have the same processing speed in treating signaling messages and they consume the same amount of time to activate the protection switching (making nodes ready to forward traffic switched over from working channel). With those assumptions, the protection switching time experienced by both end nodes in O-APS will be the same. We thus only compare the protection switching time perceived by one end node in O-APS.

Let us define the following notations:

Tn: nodal processing time of signaling message.

Tp: propagation time between two adjacent nodes.

Tinit: time to initiate a signaling message (CF or End-to-End Switchover Request).

Tbs: time to switch working traffic from failed working channel to protection channel after receiving a CFR message or End-to-End Switchover Response message.

Thw: time for activating protection also called nodal protection activation time that is the time to take for a node on protection path to be ready to forward working traffic switched from failed working channel.

N: total number of nodes on the ring that equals to the total spans/hops on the ring.

M: total number of hops on a working channel.

T: protection switching time.

i: the index for nodes. Assume two end nodes X and Y, i indicates the distance of a node in terms of hops from the end node Y that generated a CFR(X) for a given channel. To facilitate the discussion we name Y as the reference point.

$\Delta t_i$: time that a CFR message has to wait for protection actions being completed at node i.

In an optical ring network, both end nodes of an OCh/SPRING working channel will detect the hi-directional failure (e.g., loss of signal) almost at the same time. Moreover the protection switching actions on protection path will be initiated at each node whenever that node receives the first CF message no matter where that CF message is originated. Thus node i, where $i \leq (N-M)/2$, will most likely receives its first CF message from reference point node Y and node i, where $i > (N-M)/2$, will most likely receives its first CF message from the other end node X. We, thus, derive the formula for $\Delta t_i$ as:

$$\Delta t_i = \begin{cases} Thw - (N-M)*(Tn+Tp) - Tinit - \Delta t_{i-1} & \text{for } i \leq \frac{1}{2}(N-M) \text{ and} \\ & (Thw - (N-M)* \\ & (Tn+Tp) - Tinit - \Delta t_{i-1}) > 0 \\ Thw - 2*i*(Tn+Tp) - Tinit - \Delta t_{i-1} & \text{for } i > \frac{1}{2}(N-M) \text{ and} \\ & (Thw - 2*i*(Tn+Tp) - \\ & Tinit - \Delta t_{i-1}) > 0 \\ 0 & \text{otherwise} \end{cases}$$

Note that if (N–M)2 is an odd number, we then replace $i \leq (N-M)/2$ by $i \leq (N-M+1)/2$. The total protection switching time in O-APS will be:

$$T = 2*(N-M)*(Tn+Tp) + Tbs + Tinit + \sum_{i=1}^{N-M} \Delta t_i$$

On the other hand, since there is an explicitly designated channel owner in FRP, one can easily derive the total protection switching time for FRP as:

$$T=2*(N-M)*(Tn+Tp)+Tbs+Tinit+Thw-(Tn+Tp)=(2*(N-M)-1)*(Tn+Tp)+Tbs+Tinit+Thw$$

FIGS. 4-8 demonstrate the non-linearity nature of protection switching time in the proposed O-APS, subject to various parameters as opposed to the linearity in FRP. This non-linearity allows one to have a larger ring for a given protection switching time requirement while keeping other parameters fixed. The analytical analysis also reveals that in O-APS the ratio of nodal protection activation time to the one-way delay of a CF message is the most critical factor. If the ratio is less than one, the protection switching activation time has no impacts on the total protection switching time as shown FIGS. 4 and 5.

For uni-directional failure scenarios, similar results hold for both O-APS and FRP except that if the failure is not detected by channel owner in FRP one will definitely expect extra delay due to failure notification process. However, in O-APS the notification is done using SONET K-byte short path signal, the delay is negligible. The performance advantages of O-APS over FRP are very well illustrated in FIGS. 4-8. However, one pays the price of introducing more signaling messages in O-APS especially when there is a bi-directional failure. Taking into account the nodal connectivity in an optical ring network and the degree of performance improvement of O-APS, one can easily make a trade-off between the protection switching time and signaling message volume.

CONCLUSION

According to the above discussion it is evident that one cannot degenerate optical mesh networks into optical ring networks. Not only are the equipment residing in optical ring networks different in nature from those in optical mesh networks, they also tackle the issues on different spaces in terms of customers needs for protection switching. OCh/SPRING is a unique service that can only be offered on optical ring networks. In terms of protection switching time, optical rings are expected to have the same level of performance as conventional SONET APS where K bytes in SONET headers are used to signal the protection switching.

New challenges embedded in any IP based signaling protocols must also be recognized. Several factors contribute toward the total protection switching time after fault is detected. The major ones are signal propagation delay, IP packet processing delay at each nodes and the time for activating protection at each nodes that will be referred as nodal protection activation time. IP packet processing delay can be introduced while examining the content of the signaling packet and queuing delay in the forwarding process. The last one, nodal protection activation time, is very much technology dependent in particular. One could very well expect a wide range of differences among various vendors depending on whether it is an all-optical transparent box or an O-E-O type of box.

Imposing the solution proposed in the FRP onto an optical ring that supports OCh/SPRING results a linear growth of the protection switching time subject to all the above delays as well as the number of nodes on the ring. Given the fact that OCh/SPRING technology allows wavelength reuse, the linear growth of the protection switching time will limit the ring size in terms of number of nodes that can reside on rings and the traffic demands that a ring can accommodate so as to meet the strict protection time requirement. It will also force one to increase the number of interconnected rings for a given set of traffic demands while alternately one could have larger rings with less number of interconnected rings, which is considered to have more dramatic cost implications. To tackle the concerns that the protection switching time requirement can actually set limit on rings size, the embodiments of the present invention for O-APS break the linear growth of protection switching time subject to nodal protection activation time. In the O-APS embodiments, both endpoints are allowed to initiate protection switching signaling process. The integrity of the O-APS algorithm is guaranteed by its well-defined associated nodal behavior along the protection path. As a result, the degree of protection switching time's dependency on nodal protection activation time is greatly reduced.

Although various embodiments are specifically illustrated and described herein, it will be appreciated that modifications and variations of the invention are covered by the above teachings and are within the purview of the appended claims without departing from the spirit and intended scope of the invention. For example, certain types of optical networks are described in conjunction with the present invention, however, other types may be appropriate for the present invention. Furthermore, these examples should not be interpreted to limit the modifications and variations of the invention covered by the claims but are merely illustrative of possible variations.

What is claimed is:

1. A method for processing channel failure response messages in an optical network comprising:

merging a plurality of channel failure response messages into one combination channel failure response message as long as all of the plurality of channel failure response messages travel in a same direction;

determining which of the plurality of channel failure response messages will be included in the combination channel failure response message based on a first channel failure response message of the plurality of channel failure response messages waiting at a head of a queue; and forwarding the combination channel failure response message to a next node only after protection switching actions of corresponding circuits of all other embedded channel failure response messages in the combination channel failure response message are complete.

2. The method according to claim 1, further comprising forwarding a combination channel failure response message received by an intermediate node to a next node only upon completion of protection switching actions for all embedded circuits.

3. The method according to claim 1, further comprising stripping corresponding channel information out of the combination channel failure response message whenever the combination channel failure response message reaches an end node corresponding to the channel information.

4. The method according to claim 1, further comprising discarding the combination channel failure response message only after all corresponding end nodes of circuits have received the combination channel failure response message.

5. A method for operating an optical network, which has two end nodes coupled together by one or more intermediate nodes, comprising:

in response to a bi-directional failure in which both end nodes detect the failure:

transmitting a channel failure message from at least two nodes in the network in parallel in response to a channel failure detection;

performing protection switching actions at two end nodes before transmitting channel failure messages; and performing protection switching actions in a third node in response to receipt of a channel failure message from either of the at least two nodes;

merging a plurality of channel failure response messages into one combination channel failure response message as long as all of the plurality of channel failure response messages travel in a same direction;

determining which of the plurality of channel failure response messages will be included in the combination channel failure response message based on a first channel failure response message of the plurality of channel failure response messages waiting at a head of a queue; and forwarding the combination channel failure response message to a next node only after protection switching actions of corresponding circuits of all other embedded channel failure response messages in the combination channel failure response message are complete.

6. The method according to claim 5, further comprising transmitting a channel failure response message from one of the at least two nodes upon receipt of the channel failure message from the other of the at least two nodes.

7. The method according to claim 6, further comprising forwarding a channel failure response message from the third node only after completing protection switching actions in the third node.

8. The method according to claim 6, further comprising switching working traffic to the protection path at one of the at least two nodes upon receipt of the channel failure response message from the other of the at least two nodes.

* * * * *

UNITED STATES PATENT AND TRADEMARK OFFICE
CERTIFICATE OF CORRECTION

PATENT NO. : 7,277,631 B1
APPLICATION NO. : 10/200066
DATED : October 2, 2007
INVENTOR(S) : Ravichandran Iyer et al.

It is certified that error appears in the above-identified patent and that said Letters Patent is hereby corrected as shown below:

On the Title page item (57) Abstract, Line 14, after "regardless", insert -- of --.

Col. 2, line 6, after "crucial", insert -- . --.

Col. 2, line 25, after "fault-free", change "condition" to -- conditions --.

Col. 2, line 43, after "approach", insert -- , --.

Col. 2, line 49, after "result", change "of" to -- from --.

Col. 2, line 58, first word in line, change "nodes" to -- node --.

Col. 2, line 59, first word in line, change "nodes" to -- node --.

Col. 5, line 25, after "after", change "do" to -- doing --.

Col. 6, line 2, after "node", change "forward" to -- forwards --.

Col. 6, line 4, after "has", insert -- , --.

Col. 6, line 4, after "definition", insert -- , --.

Col. 7, line 15, after "time", change "to take" to -- it takes --.

Col. 7, line 53, after "and", change "transmit" to -- transmits --.

Col. 8, line 66, first word in line, change "till" to -- until --.

Col. 10, line 16, after "readiness", insert -- , --.

Col. 13, line 5, after "exhibit", insert -- the --.

Col. 13, line 27, after "equals", delete -- to --.

Col. 13, line 45, first word in line, change "receives" to -- receive --.

Col. 13, line 46, after "likely", change "receives" to -- receive --.

Col. 14, line 22, after "no", change "impacts" to -- impact --.

UNITED STATES PATENT AND TRADEMARK OFFICE
CERTIFICATE OF CORRECTION

PATENT NO. : 7,277,631 B1
APPLICATION NO. : 10/200066
DATED : October 2, 2007
INVENTOR(S) : Ravichandran Iyer et al.

It is certified that error appears in the above-identified patent and that said Letters Patent is hereby corrected as shown below:

Col. 14, line 25, after "FRP", insert -- , --.

Col. 14, line 26, after "by", change "channel owner in FRP" to -- the channel owner in FRP, --.

Col. 14, line 28, after "O-APS", insert -- , --.

Col. 14, line 29, after "signal", insert -- and --.

Col. 14, line 56, after "each", change "nodes" to -- node --.

Signed and Sealed this

Seventeenth Day of June, 2008

JON W. DUDAS
*Director of the United States Patent and Trademark Office*